United States Patent
Gervais et al.

(10) Patent No.: US 12,179,128 B2
(45) Date of Patent: Dec. 31, 2024

(54) HPLC-BASED DETECTION OF FLOCCULATION AGENTS IN A PROTEIN SAMPLE

(71) Applicant: UCB BIOPHARMA SRL, Brussels (BE)

(72) Inventors: Annick Gervais, Anderlecht (BE); Joel Dubisy, Anderlecht (BE)

(73) Assignee: UCB BIOPHARMA SRL, Brussels (BE)

( * ) Notice: Subject to any disclaimer, the term of this patent is extended or adjusted under 35 U.S.C. 154(b) by 360 days.

(21) Appl. No.: 17/620,137

(22) PCT Filed: Jun. 18, 2020

(86) PCT No.: PCT/EP2020/066922
§ 371 (c)(1),
(2) Date: Dec. 17, 2021

(87) PCT Pub. No.: WO2020/254483
PCT Pub. Date: Dec. 24, 2020

(65) Prior Publication Data
US 2022/0241701 A1    Aug. 4, 2022

(30) Foreign Application Priority Data
Jun. 20, 2019   (EP) .................................... 19181523

(51) Int. Cl.
*B01D 15/32* (2006.01)
*B01D 15/16* (2006.01)
*G01N 30/34* (2006.01)
*G01N 30/88* (2006.01)

(52) U.S. Cl.
CPC ......... *B01D 15/327* (2013.01); *B01D 15/166* (2013.01); *G01N 30/34* (2013.01); *G01N 2030/8831* (2013.01)

(58) Field of Classification Search
CPC .... B01D 15/327; B01D 15/166; G01N 30/34; G01N 2030/8831
USPC ....................................................... 210/635
See application file for complete search history.

(56) References Cited

FOREIGN PATENT DOCUMENTS

| CN | 108760962 A | * 11/2018 |
|----|----|----|
| JP | H 01221392 | 9/1989 |
| JP | 2011-153152 | 8/2011 |
| JP | 2012-250988 | 12/2012 |
| JP | 2016-107100 | 6/2016 |
| JP | 2017-115076 | 6/2017 |

OTHER PUBLICATIONS

Machine-generated English translation of CN 108760962, generated on Apr. 5, 2024.*

(Continued)

*Primary Examiner* — Fred Prince
(74) *Attorney, Agent, or Firm* — SALIWANCHIK, LLOYD & EISENSCHENK (57) ABSTRACT

The current application provides a rapid and simple method for measuring residual pDADMAC in a sample containing a recombinant protein of interest based on the combination of use of reversed-phase hydrophobic interaction HPLC and charged aerosol detection.

11 Claims, 7 Drawing Sheets

(56) References Cited

OTHER PUBLICATIONS

Medhi, K. et al. "Determination of residual poly diallyldimethylammonium chloride (pDADMAC) in monoclonal antibody formulations by size exclusion chromatography and evaporative light scattering detector" *Biologicals*, available online Nov. 14, 2018, pp. 21-28, vol. 57.
Tomic, S. et al. "Complete clarification solution for processing high density cell culture harvests" *Separation and Purification Technology*, available online Dec. 15, 2014, pp. 269-275, vol. 141.
McNerney, T. et al. "PDADMAC flocculation of Chinese hamster ovary cells: Enabling a centrifuge-less harvest process for monoclonal antibodies" *mAbs*, 2015, pp. 413-427, vol. 7, Issue 2.
Written Opinion in International Application No. PCT/EP2020/066922, Sep. 4, 2020, pp. 1-5.

\* cited by examiner

Figure 1 – Calibration Curve

Figure 2 – Linearity of the results

Figure 3 – 1µg pDADMAC spiked in the Drug Substance sample

Figure 4 – Individual Trueness at the 1µg pDADMAC level spiked in two Drug Substance samples

| Occasion | Samples | pDADMAC concentrations (µg/mL) | | % Recovery |
|---|---|---|---|---|
| | | Theoretical | Measured | |
| 1 | Drug Substance 1 | 1.0 | 0.792 | 79.2 |
| | | | 0.821 | 82.1 |
| | | | 0.801 | 80.1 |
| 2 | | | 0.725 | 72.5 |
| | | | 0.878 | 87.8 |
| | | | 0.707 | 70.7 |
| 1 | Drug Substance 2 | | 0.757 | 75.7 |
| | | | 0.732 | 73.2 |
| | | | 0.793 | 79.3 |
| 2 | | | 0.803 | 80.3 |
| | | | 0.677 | 67.7 |
| | | | 0.713 | 71.3 |

Figure 5 – Summary of Trueness and Precision results

| Drug Substance Sample type | Theoretical pDADMAC concentration (μg/mL) | Trueness (Mean n=3 %Recovery) | Precision-Repeatability (Mean n=3 %RSD) | Intermediate Precision (Mean n=6 %RSD) |
|---|---|---|---|---|
| Non-flocculated | 1.0 | 70.7 - 87.8% | 1.9 - 12.2% | 8.0% |
| Flocculated | | 67.7 - 80.3% | 4.0 - 8.9% | 6.5% |
| Non-flocculated | 2.0 | 62.2 - 71.0% | 2.1 - 2.9% | 2.6% |
| Flocculated | | 66.3 - 89.5% | 2.4 - 7.0% | 12.7% |
| Non-flocculated | 5.0 | 73.2 - 81.8% | 3.7 - 4.6% | 3.9% |
| Flocculated | | 80.2 - 105.8% | 1.0 - 7.8% | 11.5% |

Figure 6 – Summary of Trueness and Precision results in additional modified antibody formats

| DS sample type | Occasion | Theoretical spiked pDADMAC ConC. (µg/mL) | Trueness (Mean n=6 %Recovery) | Precision-repeatability (Mean n=6 %RSD) | Intermediate-precision (Mean n=24 %RSD) |
|---|---|---|---|---|---|
| Bispecific | 1 | 1.0 | 108.7 | 5.0 | 12.3 |
| | 2 | | 105 | 8.1 | |
| | 3 | | 83.1 | 9.2 | |
| | 4 | | 96.3 | 7.1 | |
| Trivalent | 5 | | 87.3 | 3.9 | NA |

Figure 7 – 1µg pDADMAC spiked in the Drug Substance sample

HPLC-BASED DETECTION OF FLOCCULATION AGENTS IN A PROTEIN SAMPLE

CROSS-REFERENCE TO RELATED APPLICATION

This application is the U.S. national stage application of International Patent Application No. PCT/EP2020/066922, filed Jun. 18, 2020.

FIELD OF THE INVENTION

The current invention relates to the field of manufacturing recombinant proteins and their recovery and purification from a host cell supernatant. The invention makes use of a method for measuring the levels of poly(diallyldimethylammonium chloride) pDADMAC in a sample, and ensuring its removal during protein purification.

BACKGROUND OF THE INVENTION

In the field of therapeutics the use of biological entities such as proteins and antibodies and antibody-derived molecules in particular has been constantly gaining presence and importance, and, with it, the need for controlled manufacturing processes has developed in parallel. The commercialization of therapeutic proteins requires they be produced in large amounts, and a lot of effort has been dedicated to improving the host cells that express the desired protein and their processing, resulting in increased product titers. As a consequence, higher amounts of biomass and debris are also observed at the cell culture level. That biomass and debris must be removed as part of the protein purification process.

One approach to help remove the biomass to obtain a clarified cell culture fluid from which to purify the protein of interest includes the use of flocculating agents such as cationic polymers that are used to encapsulate mammalian cells and enzymes as well as to flocculate microbial cell cultures. Typically the flocculant is allowed to settle and then removed from the cell culture fluid that will then be further processed by centrifugation and/or through a depth filter, to obtain what is termed a clarified cell culture from which the protein of interest will be purified.

Flocculants can be anionic, cationic or "multimodal". When the pH of a solution is less than the pI of a particular protein, the protein carries a net positive charge. Under these conditions, a cationic polyelectrolyte may precipitate impurities and leave the protein of interest in solution. Conversely, an anionic polyelectrolyte may precipitate the protein of interest forming a protein-polyelectrolyte precipitate, leaving impurities in solution.

Cationic polymers are particularly suited for this use given that cells and cellular debris typically have an overall negative charge. This results in the formation of neutralized particles formed through ionic interactions that fall out of solution. Examples of cationic polymers used in the flocculation of clarified cell culture fluid from recombinant protein producing cells include poly(diallyldimethylammonium chloride) (pDADMAC), polyamines, polyaminoacids, polyacrylamides and chitosan.

On the other hand anionic flocculants have also been used in this context, in particular anionic polyelectrolytes, polyvinylsulfonic acid, polyacrylic acid and carboxymethyl dextran sulfate have been evaluated for enrichment and selective precipitation of monoclonal antibodies from CHO cell harvests leaving impurities in the supernatant.

More recent approaches have tried using flocculants with multimodal functionalities that do not require customization and can be used with a broad range of antibodies.

Additional information regarding the use of flocculating agents to clarify cell culture supernatant may be found in Singh et al. 2016 Clarification technologies for monoclonal antibody manufacturing processes: current state and future perspectives Biotechnol Bioeng 113:698.

From the perspective of large scale commercial manufacture of therapeutics it is essential to ensure the removal of such flocculating agents during the subsequent purification process to levels that are safe for administration to humans prior to preparation of the protein into an administrable form.

An example of cationic polymer that is known as a flocculating agent useful in cell culture is poly(diallyldimethylammonium chloride) (pDADMAC) (see e.g. Peck et al. 2015 Dosing considerations and impacts on the clarification of mammalian cell culture feed streams using poly-diallyldimethylammonium chloride flocculant in conjunction with Clarisolve® depth filters). To date the method of measuring residual pDADMAC in pretreated cell culture feed streams is based on the use of surface plasmon resonance (see e.g. Detection of residual pDADMAC using surface plasmon resonance spectroscopy, Merck KGaA). A further recent method is based on the use of evaporative light scattering detection (ELSD) (Khodadadian et al. 2019 Determination of residual poly diallyldimethylammonium chloride (pDADMAC) in monoclonal antibody formulations by size exclusion chromatography and evaporative light scattering detector) Biologicals 57:21. However, existing methods have limitations in terms of precision, sensitivity, dynamic range and the nature of calibration curves.

There is therefore a continuing need to provide rapid and robust methods for detecting levels of residual flocculating agents applicable to samples containing a complex mixture of proteins that will allow assessment of clearance of this flocculating agent during the manufacturing processes.

SUMMARY OF THE INVENTION

The current invention provides a rapid and simple method for measuring pDADMAC in a sample containing a recombinant protein of interest comprising the use of reversed-phase hydrophobic interaction HPLC and charged aerosol detection.

In a first aspect, the invention relates to a method for measuring pDADMAC in a sample containing a recombinant protein of interest, the method comprising the following steps:
  a) applying the sample to reversed-phase hydrophobic interaction HPLC,
  b) eluting bound pDADMAC from the column using hydrophobic gradient elution,
  c) measuring the pDADMAC recovered in step b) using a charged aerosol detector, wherein the sample applied in a) comprises 0.2-3% (v/v) of a CAD-compatible acid.

In a further aspect, the invention relates to a method of manufacturing a protein of interest comprising the addition of pDADMAC during protein purification, wherein subsequent removal of said pDADMAC is measured according to the method of the invention for measuring pDADMAC.

DETAILED DESCRIPTION OF THE INVENTION

The present invention solves the above identified need by providing a new method for detecting pDADMAC in a complex protein mixture that is fast and simple and allows assessment of clearance of this flocculating agent during protein manufacturing. In particular, this method allows for measurement of pDADMAC in real time during the various purification steps.

In a first aspect, the present invention refers to a method for measuring pDADMAC in a sample containing a protein of interest, the method comprising the following steps:
a) applying the sample to reversed-phase hydrophobic interaction HPLC,
b) eluting bound pDADMAC from the column using an hydrophobic gradient elution,
c) measuring the pDADMAC recovered in step b) using a charged aerosol detector, wherein the sample applied in a) comprises 0.2-3% of a CAD-compatible acid.

The Charged Aerosol Detector (CAD) is designed to be used in HPLC separations performed with volatile aqueous/organic mobiles phases.

The hydrophobic gradient elution involves a modification of the hydrophobicity of the mobile phases between the beginning (e.g. 90% aqueous) and the end (e.g. 90% organic; Methanol/Acetonitrile) of the separation.

As the method involves the use of a CAD instrument that requires an evaporative process of detection, it requires a volatile mobile phase to which a compatible additive can be added. Also the additives contained in the sample injected in the chromatography step as well as in the mobile phase that enters the CAD must be compatible. The method of the invention uses a "CAD-compatible acid". This term, when used herein, refers to any acid that is suitable for use in CAD. Typically acidic additives that are used in CAD detection include TFA (tri-fluoro acetic acid), acetic acid, formic acid, or heptafluorobutyric acid.

By way of example, the hydrophobic gradient may be obtained by using mobile phase A=0.1% TFA (tri-fluoro-acetic acid)/$H_2O$, mobile phase B=0.1% TFA/$CH_3CN$ and mobile phase C=0.1% TFA/MeOH. This example should not be seen as limiting given that a person skilled in the art would know of different volatile mobile phases available for such a gradient such as mobile phases bases on the use for example of ethanol or isopropanol as an organic solvent, to which a CAD-compatible acid modifier will be added.

The CAD device enables the detection of all non-volatile and many semi-volatile analytes in the eluent. The compound of interest (pDADMAC polymer) does not need to possess a chromophore, as is the case with UV detection, nor to be ionized, as with mass spectrometry. In CAD, the detector measures charge imparted to dried particles that are formed from an ultra-fine aerosol of the analyte. The charge measured is proportional to the amount of the analyte in the sample. Operating a CAD detector is rather simple and just requires setting of a few controllable parameters, offering an increased sensitivity compared to ELSD (evaporative light scattering detector) detection.

pDADMAC or poly(diallyldimethylammonium chloride) is a water-soluble cationic polymer that is very effective as a flocculation agent, in that it rapidly flocculates the negatively charged cells and cellular debris into larger particles via an ionic interaction mechanism. pDADMAC is available in different polymer sizes ranging from less than 10 KDa up to 10000 KDa, although for flocculating mammalian cell cultures often a medium average molecular weight size (e.g. around 500 KDa) is used and can be obtained by known providers such as Merck.

In a particular embodiment, said hydrophobic interaction HPLC (high pressure liquid chromatography) is PLRP-S HPLC, i.e. Polymer Laboratories Reversed Phase—Styrene (Divinylbenzene) as supplied by Agilent or Phenomenex. The PLRP-S HPLC column is packed with a macroporous, inherently and uniformly hydrophobic stationary phase without residual surface functionalities (i.e. no typical silica problems of acidic silanol groups) to enable optimum separation performances. An expert in the field would understand that an appropriate pore size would be chosen depending on the molecules to separate. The 1000 Å pore size of the packing material suits particularly for the separation of the high molecular weight species present in the samples of the invention (including pDADMAC polymer). The PLRP-S material is mechanically stable to the pressure obtained in the optimized analytical conditions. In addition, the PLRP-S HPLC column can be used to perform separations across pH 1 to 14 with none of the restrictions associated with silica packings. Thus, in a particular embodiment of the invention the PLRP-S column has a pore size of 1000 Å.

In another embodiment of the method of the invention the sample comprises 0.1%-3% of a CAD-compatible acid, such as 0.1%-2% of a CAD-compatible acid, or 0.1%-1.5% of a CAD-compatible acid, or 0.5%-1.5% of a CAD-compatible acid. In a further embodiment of the invention the sample comprises 1% CAD-compatible acid.

In one embodiment, the sample applied in step a) has a pH from 2 to 4.

Possible CAD-compatible acids in the context of the present invention include but are not limited to trifluoroacetic acid (TFA), heptafluorobutyric acid, acetic acid or formic acid. In a particular embodiment of the method of the invention, said CAD-compatible acid is trifluoro-acetic acid.

The exact proportion and nature of the CAD-compatible acid will be chosen by the skilled artisan in view of the specific properties of the sample, and in particular to the properties of the recombinant protein of interest that is the object of the purification.

In a particular embodiment of the invention, said CAD-compatible acid will be added to the sample prior to step a) of the above described method, such as, for example, by addition from a stock solution 15% (vol/vol) of a CAD-compatible acid.

The addition of an acid to the sample can have an effect on the solubility of the recombinant protein also contained in the sample, and may in some instances cause it to precipitate. This precipitate may also contain some residual pDADMAC that would hence provide an underestimation of the amount of pDADMAC present in the sample. In order to avoid such a phenomenon, the skilled artisan would be aware of the beneficial effect of diluting the sample to decrease the concentration of recombinant protein.

Similarly, if desiring to adjust the protein concentration the sample may be diluted using an appropriate buffer, such as for example by addition of further buffer already in the sample.

In one embodiment of the method of the invention, the sample applied in step a) comprises a recombinant protein concentration of less than 200 mg/ml, such as less than 100 mg/ml, e.g. less than 60 mg/ml. In a further particular embodiment, the sample comprises a recombinant protein concentration of from 20 to 60 mg/ml.

Similarly, other sample preparation techniques may be desired such as a filtration step to remove molecules of a smaller molecular weight.

In one embodiment of the method of the invention the sample applied in step a) has been filtered with a filter having a pore size of 80 kDa or less, 60 kDa or less, 50 kDa or less. In one further particular embodiment the sample is filtered with a filter having a pore size of 30 kDa.

Similarly an acidic treatment of the sample may be desired, such that some or all of the protein present in the sample is digested. In another embodiment the method comprises an acidic treatment of the sample before its application in step a). In a further embodiment of the method, the sample is subjected to an acidic treatment step and a filtration step prior to its application in step a).

In a particular embodiment, the method of the invention further comprises a step of determining the concentration of pDADMAC present in the sample by reference to a control.

Typically, a calibration curve is prepared using known concentrations of pDADMAC added to the formulation buffer and treated according to the method of the invention. When the method of the invention is to be used in a quantitative assay, the pDADMAC charge measured in samples with unknown amounts of the polymer is interpolated in the calibration curve to obtain the pDADMAC concentration of the sample. However the method of the invention may also be used in "limit test" assays, i.e. tests where the objective is to determine that the presence of pDADMAC is below a specific limit of interest. In these "limit tests", each sample is analyzed "as is" and spiked with an amount of pDADMAC equivalent to the limit of interest. For example if the limit of interest is 1 µg/ml of pDADMAC, a sample is taken and divided into 2 aliquots, one resulting aliquot is spiked with 1 µg/ml of pDADMAC and the concentration of pDADMAC is measured by interpolation in the calibration curve and the remaining aliquot is then measured directly by the method of the invention and the absence of pDADMAC is verified by interpolation to the calibration curve.

The sample comprising the recombinant protein of interest may be obtained directly from a step in the purification process, or it may be obtained at the end of said process or from a step within the purification process allowing analysis of gradual clearance of the pDADMAC.

In one embodiment, the sample applied in step a) is a sample obtained directly from a step in the purification of said recombinant protein to which the CAD-compatible acid has been added.

In the field of therapeutics, the protein of interest may be for example selected from antibodies, cytokines, growth factors, hormones, and other regulatory peptides and proteins. Such proteins may be extracted from tissues and secretions, but with the development of biotechnology and the increasing need for higher quantities of these molecules and higher standardization in their preparation, they are more frequently produced as recombinant proteins.

In a particular embodiment of the current invention, the recombinant protein of interest is an antibody, an antibody fragment, or a derivative thereof.

A recombinant protein of interest, such as for example an antibody, manufactured for large-scale commercial purposes can be produced by culturing eukaryotic host cells transfected with one or more expression vectors encoding the recombinant antibody. The eukaryotic host cells are preferably mammalian cells, more preferably Chinese Hamster Ovary (CHO) cells.

Mammalian cells may be cultured in any medium that will support their growth and expression of the antibody, preferably the medium is a chemically defined medium that is free of animal-derived products such as animal serum and peptone. There are different cell culture mediums available to the person skilled in the art comprising different combinations of vitamins, amino acids, hormones, growth factors, ions, buffers, nucleosides, glucose or an equivalent energy source, present at appropriate concentrations to enable cell growth and protein production. Additional cell culture media components may be included in the cell culture medium at appropriate concentrations at different times during a cell culture cycle that would be known to those skilled in the art.

Mammalian cell culture can take place in any suitable container such as a shake flask or a bioreactor, which may or may not be operated in a fed-batch mode depending e.g. on the scale of production required. These bioreactors may be either stirred-tank or air-lift reactors. Various large scale bioreactors are available with a capacity of more than 1,000 L to 50,000 L, preferably between 5,000 L and 20,000 L, or to 10,000 L. Alternatively, bioreactors of a smaller scale such as between 2 L and 100 L may also be used to manufacture an antibody according to the method of the invention.

An antibody or antigen-binding fragment thereof that can be manufactured in accordance with the methods of the present invention is typically found in the supernatant of a mammalian host cell culture, typically a CHO cell culture. For CHO culture processes wherein the protein of interest, such as an antibody or antigen-binding fragment thereof, is secreted in the supernatant, said supernatant is collected by methods known in the art, typically by centrifugation. For avoidance of doubt, supernatant denotes the liquid lying above the sedimented cells resulting from the centrifugation of the cell culture.

Flocculation is a process whereby particles in suspension form larger-size aggregates or clusters. During this process, particles come out of suspension in the form of floc by the addition of the flocculating agent. Flocculating agents can be anionic of cationic polymers. Natural flocculants exist as well as synthetic flocculants that can be manufactured to have specific molecular weights and distributions.

Cationic polymers interact with negatively charged particles, such as organic substances. In cell culture supernatants, cationic polymers interact with negatively charged particles such as viable and non-viable cells, cell metabolites and cellular debris including nucleic acids, proteins and liposomes. Flocculation of negatively charged compounds found in cell culture supernatants with cationic polymers results in the formation of larger particles that then fall out of solution.

The addition of a cationic polymer, such as poly(diallyldimethylammonium chloride) (pDADMAC), to mammalian cell culture media that contains or has contained cells expressing recombinant proteins flocculates the negatively charged particles, including cells (viable and non-viable), cell metabolites and cellular debris. These large flocculated particles can then be removed by centrifugation or by gravity settling, producing a feed stream with a significantly higher harvest filter train throughput compared to a typical centrifuged harvest feed stream.

The supernatant that is recovered after this filter train is typically referred to as a clarified cell culture fluid that will then be further processed with a number of steps, typically including 2 or 3 chromatography steps and ultrafiltration/diafiltration steps in order to obtain the purified protein of interest.

During this further purification or downstream purification process, residual flocculating agent such as pDADMAC, as well as other impurities including host cell proteins, protein aggregates and degradation products, will also be removed.

In this context it may be of interest to measure the final concentration of pDADMAC in the purified protein sample (typically referred to as drug substance) to ensure adequate clearance, but it may also be of interest to perform this measurement during the purification steps to improve control of the overall process.

Therefore in a particular embodiment of the process of the invention the sample is obtained from the final purified protein of interest. And in an alternative embodiment of the method of the current invention, the sample is obtained from a step in the purification stream of said protein.

In a second aspect, the current invention refers to a method of manufacturing a protein of interest comprising a step of addition of pDADMAC during protein purification, wherein removal of said pDADMAC is measured according to the method described in the preceding paragraphs.

The term "antibody" or "antibodies" as used herein refers to monoclonal or polyclonal antibodies. The term "antibody" or "antibodies" as used herein includes but is not limited to recombinant antibodies that are generated by recombinant technologies as known in the art. "Antibody" or "antibodies" include antibodies' of any species, in particular of mammalian species; such as human antibodies of any isotype, including IgD, $IgG_1$, $IgG_{2a}$, $IgG_{2b}$, $IgG_3$, $IgG_4$ IgE and antibodies that are produced as dimers of this basic structure including $IgGA_1$, $IgGA_2$, or pentamers such as IgM and modified variants thereof, non-human primate antibodies, e.g. from chimpanzee, baboon, rhesus or cynomolgus monkey; rodent antibodies, e.g. from mouse, or rat; rabbit, goat or horse antibodies; and camelid antibodies (e.g. from camels or llamas such as Nanobodies™) and derivatives thereof; or of bird species such as chicken antibodies or of fish species such as shark antibodies. The term "antibody" or "antibodies" also refers to "chimeric" antibodies in which a first portion of at least one heavy and/or light chain antibody sequence is from a first species and a second portion of the heavy and/or light chain antibody sequence is from a second species. Chimeric antibodies of interest herein include "primatized" antibodies comprising variable domain antigen-binding sequences derived from a non-human primate (e.g. Old World Monkey, such as baboon, rhesus or cynomolgus monkey) and human constant region sequences. "Humanized" antibodies are chimeric antibodies that contain a sequence derived from non-human antibodies. For the most part, humanized antibodies are human antibodies (recipient antibody) in which residues from a hypervariable region of the recipient are replaced by residues from a hypervariable region [or complementarity determining region (CDR)] of a non-human species (donor antibody) such as mouse, rat, rabbit, chicken or non-human primate, having the desired specificity, affinity, and activity. In most instances residues of the human (recipient) antibody outside of the CDR; i.e. in the framework region (FR), are additionally replaced by corresponding non-human residues. Furthermore, humanized antibodies may comprise residues that are not found in the recipient antibody or in the donor antibody. These modifications are made to further refine antibody performance. Humanization reduces the immunogenicity of non-human antibodies in humans, thus facilitating the application of antibodies to the treatment of human disease. Humanized antibodies and several different technologies to generate them are well known in the art. The term "antibody" or "antibodies" also refers to human antibodies, which can be generated as an alternative to humanization. For example, it is possible to produce transgenic animals (e.g., mice) that are capable, upon immunization, of producing a full repertoire of human antibodies in the absence of production of endogenous murine antibodies. For example, it has been described that the homozygous deletion of the antibody heavy-chain joining region (JH) gene in chimeric and germ-line mutant mice results in complete inhibition of endogenous antibody production. Transfer of the human germ-line immunoglobulin gene array in such germ-line mutant mice will result in the production of human antibodies with specificity against a particular antigen upon immunization of the transgenic animal carrying the human germ-line immunoglobulin genes with said antigen. Technologies for producing such transgenic animals and technologies for isolating and producing the human antibodies from such transgenic animals are known in the art. Alternatively, in the transgenic animal; e.g. mouse, only the immunoglobulin genes coding for the variable regions of the mouse antibody are replaced with corresponding human variable immunoglobulin gene sequences. The mouse germline immunoglobulin genes coding for the antibody constant regions remain unchanged. In this way, the antibody effector functions in the immune system of the transgenic mouse and consequently the B cell development is essentially unchanged, which may lead to an improved antibody response upon antigenic challenge in vivo. Once the genes coding for a particular antibody of interest have been isolated from such transgenic animals the genes coding for the constant regions can be replaced with human constant region genes in order to obtain a fully human antibody. Other methods for obtaining human antibodies/antibody fragments in vitro are based on display technologies such as phage display or ribosome display technology, wherein recombinant DNA libraries are used that are either generated at least in part artificially or from immunoglobulin variable (V) domain gene repertoires of donors. Phage and ribosome display technologies for generating human antibodies are well known in the art. Human antibodies may also be generated from isolated human B cells that are ex vivo immunized with an antigen of interest and subsequently fused to generate hybridomas which can then be screened for the optimal human antibody. The term "antibody" or "antibodies" as used herein, also refers to an aglycosylated antibody.

The term "antibody" or "antibodies" as used herein not only refers to untruncated antibodies of any species, including from human (e.g. IgG) and other mammalian species, but also refers to an antibody fragment. A fragment of an antibody comprises at least one heavy or light chain immunoglobulin domain as known in the art and binds to one or more antigen(s). Examples of antibody fragments according to the invention include Fab, Fab', F(ab')2, and Fv and scFv fragments; as well as diabodies, triabodies, tetrabodies, minibodies, domain antibodies (dAbs), such as single domain antibodies (sdAbs), $V_HH$ and $V_{NAR}$ fragments, single-chain antibodies, bispecific, trispecific, tetraspecific or multispecific antibodies formed from antibody fragments or antibodies, including but not limited to Fab-Fv or Fab-Fv-Fv constructs. Antibody fragments as defined above are known in the art.

In one embodiment the antibody is a multispecific antibody molecule comprising or consisting of:

a) a polypeptide chain of formula (I):

VH—CH1-X—V1; and b) a polypeptide chain of formula (II):

VL-CL-Y—V2;

wherein:

VH represents a heavy chain variable domain;

CH1 represents a domain of a heavy chain constant region, for example domain 1 thereof;

X represents a bond or linker;

Y represents a bond or linker;

V1 represents a dsFv, a sdAb, a scFv or a dsscFv;

VL represents a light chain variable domain;

CL represents a domain from a light chain constant region, such as Ckappa

V2 represents dsFv, a sdAb, a scFv or a dsscFv;

wherein at least one of V1 or V2 is a dsFv or dsscFv, described in WO2015/197772 incorporated herein by reference.

"Single chain variable fragment" or "scFv" as employed herein refers to a single chain variable fragment comprising or consisting of a heavy chain variable domain (VH) and a light chain variable domain (VL) which is stabilised by a peptide linker between the VH and VL variable domains. The VH and VL variable domains may be in any suitable orientation, for example the C-terminus of VH may be linked to the N-terminus of VL or the C-terminus of VL may be linked to the N-terminus of VH.

"Disulphide-stabilised single chain variable fragment" or "dsscFv" refers to a single chain variable fragment which is stabilised by a peptide linker between the VH and VL variable domain and also includes an inter-domain disulphide bond between VH and VL.

"Disulphide-stabilised variable fragment" or "dsFv" refers to a single chain variable fragment which does not include a peptide linker between the VH and VL variable domains and is instead stabilised by an interdomain disulphide bond between VH and VL.

In one particular embodiment, the antibody is the multispecific antibody of the format Fab-2x dsscFv described in WO2015/197772, incorporated herein by reference.

In a further particular embodiment, the multispecific antibody molecule of the format Fab-2x dsscFv is a trivalent antibody, i.e. each Fv binds to a different epitope.

In a further particular embodiment the multispecific antibody has a Fab-dsscFv-dsFv format as described in WO2015/197772.

EXAMPLES

Below examples were performed using the 1000 Å 8µ particles (150×2.1 mm) PLRP-S column supplied by Agilent, and a 10% aqueous solution of pDADMAC supplied by Millipore (nr. 137069). As detailed below the separation between the polycationic pDADMAC polymer from the other components of the prepared sample (protein, formulation excipients, . . . ) was obtained.

Example 1: Calibration Curve Preparation

Two concentrated solutions of 25 µg and 100 µg pDADMAC/mL were prepared in a suitable protein formulation buffer using a 10% weight to volume reference solution of the polymer. These two solutions were further diluted in the buffer to obtain a calibration curve with known theoretical concentrations of 0.5, 1.0, 2.0, 5.0, 8.0 and 10.0 µg pDADMAC/mL. Each of the 6 calibration standards was acidified by adding 10 µL of an aqueous 15% (v/v) TFA solution to 100 µL of standard prior to HPLC analysis and injected twice. The analysis was carried out using a Corona™ Veo™ RS Charged Aerosol, Detector.

The gradient applied for elution was the following:

Solvent A; $H_2O$/TFA 0.1%
Solvent B: $CH_3CN$/TFA 0.1%
Solvent C: MeOH/TFA 0.1%

| Time (mm) | | FlowRate (mL/min) | % A | % B | % C |
|---|---|---|---|---|---|
| 1 | Initial | 0.800 | 90 | 5 | 5 |
| 2 | 4.00 | 0.800 | 90 | 5 | 5 |
| 3 | 5.50 | 0.800 | 50 | 5 | 45 |
| 4 | 6.30 | 0.800 | 50 | 5 | 45 |
| 5 | 7.00 | 0.800 | 37 | 18 | 45 |
| 6 | 7.50 | 0.800 | 10 | 70 | 20 |
| 7 | 14.50 | 0.800 | 10 | 70 | 20 |
| 8 | 15.00 | 0.800 | 90 | 5 | 5 |
| 9 | 18.50 | 0.800 | 90 | 5 | 5 |

Figure 1:
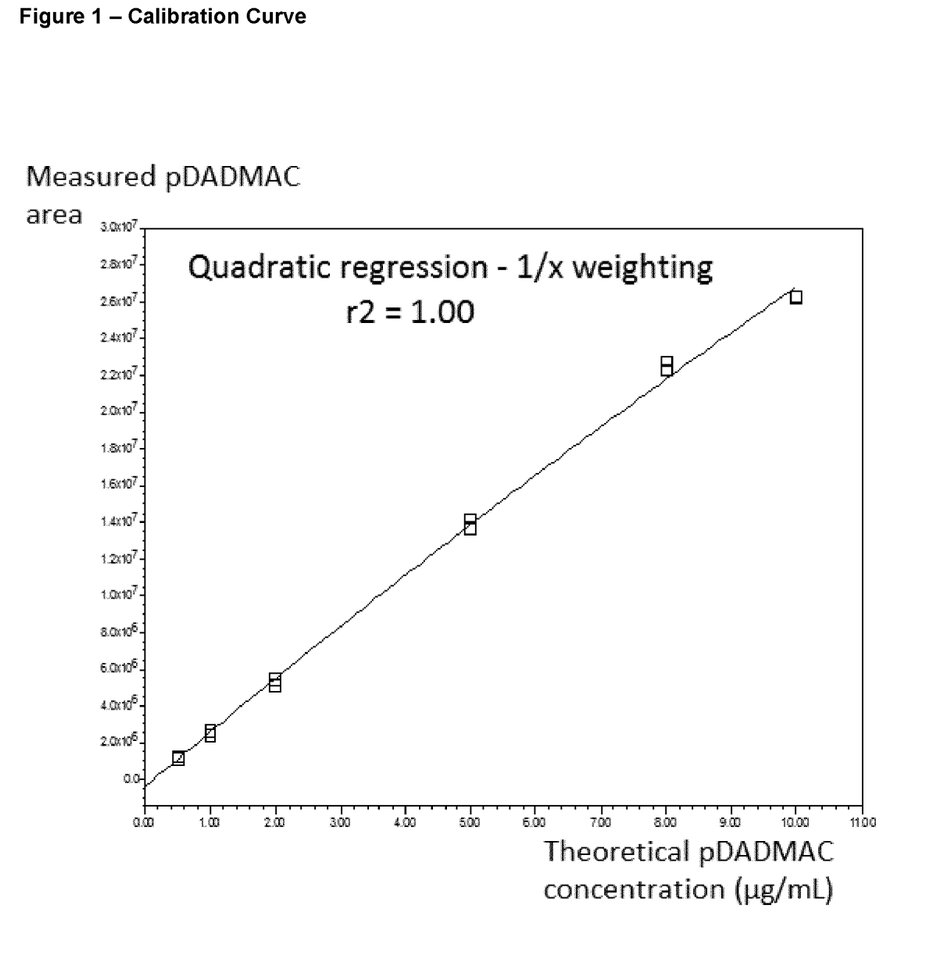
FIG. 1: Calibration Curve resulting from measuring six concentrations of pDADMAC according to the method of the invention.

The calibration standards were injected before and after each series of samples to be analyzed and the areas of the 12 injections of the calibration standards were used to build a quadratic (second order) regression line with a 1/x weighting. An example of the calibration curve obtained is presented in FIG. 1. The coefficient of determination ($r^2$) was 1.00 (≥0.98, typical acceptance criterion). The pDADMAC measurement obtained for each analyzed sample was then interpolated in the calibration curve, and the pDADMAC concentration was determined.

Example 2: Linearity of the Results

Figure 2:
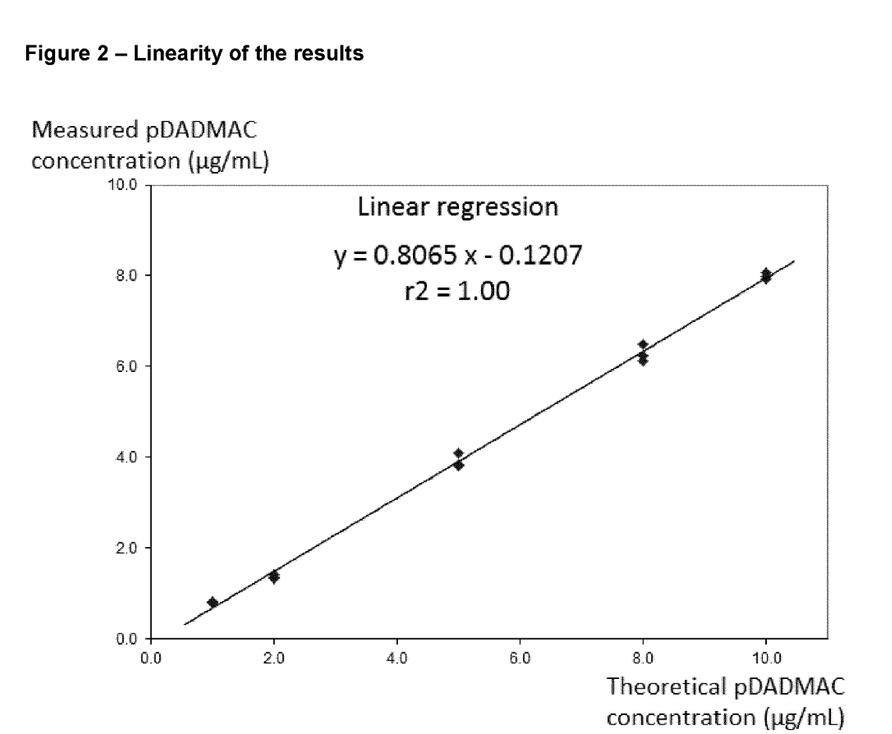
FIG. 2: Linearity of the results resulting from plotting the individual measured concentrations against the theoretical levels of pDADMAC spiked in a Drug Substance sample (five levels evaluated between 1.0 and 10.0 µg pDADMAC/mL).

On one occasion of the validation exercise, pDADMAC was spiked in a Drug Substance (IgG4) sample containing initially 56.8 mg of an antibody/mL of sample, at five concentration levels (1.0, 2.0, 5.0, 8.0 and 10.0 µg/mL) in triplicate preparations at each level. Each sample was acidified by adding 10 µL of an aqueous 15% TFA solution to 100 µL of standard and further diluted adding 110 µL of a suitable protein formulation buffer prior to HPLC analysis. The method was applied to analyze the fifteen preparations and the individual measured concentrations (µg pDADMAC/mL of spiked sample) obtained were plotted against the theoretical levels of pDADMAC spiked. As presented in FIG. 2, the coefficient of determination ($r^2$) of the linear regression obtained was 1.00 (≥0.98, typical acceptance criterion). Thus, the method is linear in the range evaluated (1.0 to 10.0 µg pDADMAC/mL of Drug Substance sample).

Example 3: Quantitative Measurement

Each sample was analyzed "as is" and spiked with 1.0 µg pDADMAC/mL of sample (triplicate preparations of each).

Each of the 6 preparations underwent the acidification and dilution step as follows: addition of 10 μL of an aqueous 15% TFA solution and 110 μL of a suitable protein formulation buffer to 100 μL of sample prior to HPLC analysis.

Figure 3:
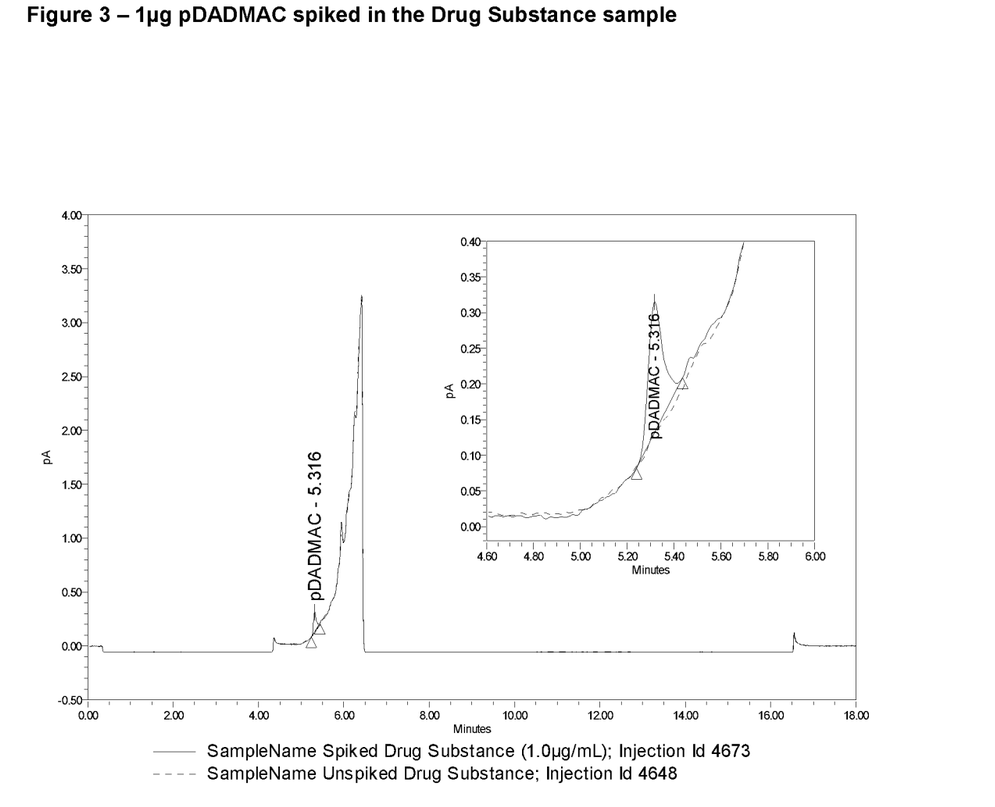
FIG. 3: Overlay of chromatographic profiles of a Drug Substance analyzed "as is" (unspiked) and spiked with 1.0 µg pDADMAC/mL.

An overlay of typical chromatographic profiles obtained for a Drug Substance sample (containing 97.8 mg of an IgG4 antibody/mL and obtained from a manufacturing process in which the flocculation with pDADMAC was applied) analyzed unspiked and spiked with 1.0 μg pDADMAC/mL is presented in FIG. 3.

To avoid possible contamination or fouling of the detector, the switching valve of the CAD instrument was used to direct the flow to the nebulizer of the detector only during the time necessary to read the pDADMAC peak signal (i.e. approximately 1 minute before and 1 minute after the pDADMAC peak retention time). The profile showed a peak representative of the pDADMAC polymer close to 5.3 minutes. The specificity of the method was demonstrated as no interfering peaks were detected at the retention time of the pDADMAC peak (5.3 minutes). In addition no significant carryover of pDADMAC was observed between samples, as established by performing the measurements for the calibration curve starting at the highest pDADMAC concentration and decreasing progressively to the least concentrated reference standard and by injecting one blank after the calibration curve.

A regression line was obtained using the injections of the 6 calibration standards taking into account the theoretical pDADMAC concentrations. The absence of pDADMAC in the unspiked sample was verified whilst the concentration measured in the spiked sample was interpolated from the curve. Using the pDADMAC concentration measured in the triplicate preparations, the 1.0 μg/mL spiked level is verified as follows:

The individual % Recovery between the measured and theoretical pDADMAC concentration must be between 60% and 140%.

The % RSD (Relative Standard Deviation), on the 3 measured pDADMAC concentrations must be ≤15%.

Figure 4:
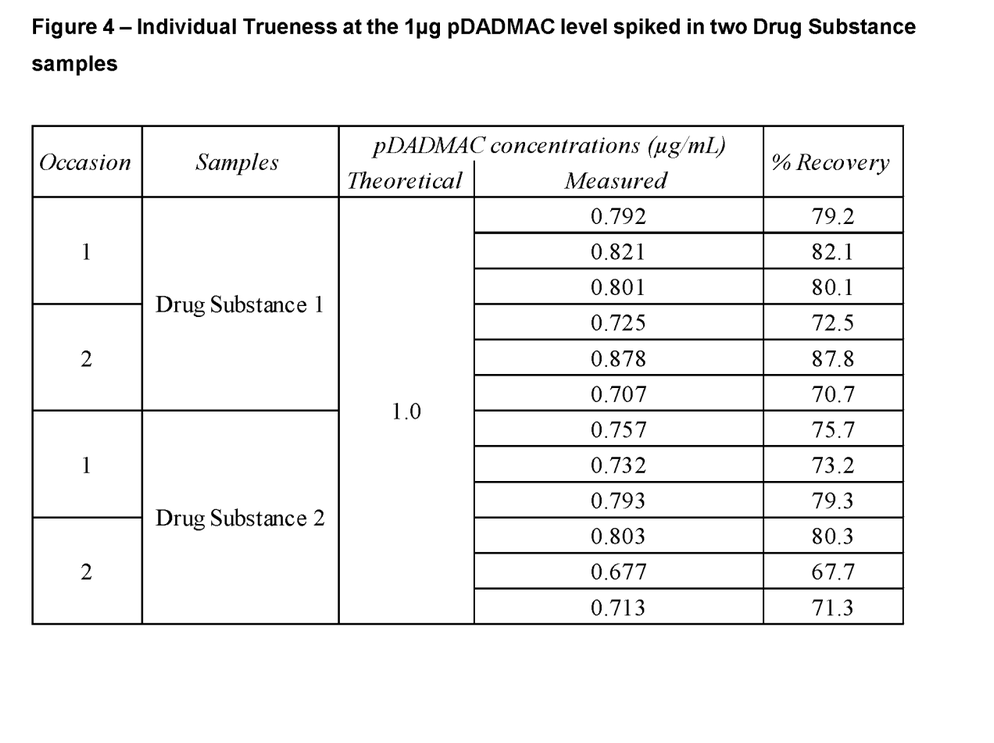
FIG. 4: Verification of the pDADMAC recovery at the 1.0 µg/mL spiking level in two different Drug Substance samples.

The pDADMAC recovery at the 1.0 μg/mL spiking level obtained in two different Drug Substance samples is presented in FIG. 4.

Example 4: Trueness, Precision and Quantitation Limit

The validation of the pDADMAC assay was performed with two Drug Substance samples. The samples came from two different manufacturing batches of the same antibody, one manufactured with the use of flocculant (hereafter named 'flocculated' sample) and another manufactured without the use of flocculant (hereafter named 'non-flocculated' sample). The non-flocculated sample contained 56.8 mg IgG4 antibody/mL whilst the flocculated sample contained 97.8 mg IgG4 antibody/mL. Both samples were spiked with three concentration levels: 1.0, 2.0 and 5.0 μg pDADMAC/mL and analyzed twice (on separate days) with the method of the invention in triplicate preparations at each level. Each preparation underwent the same acidification and dilution step described in Examples 2 and 3 above. The following parameters were evaluated:

the Trueness (% Recovery) was calculated based on the actual measured pDADMAC concentration (mean of the triplicate preparations at each level within each occasion) compared to the theoretical pDADMAC concentration.

the Precision-Repeatability (% RSD, n=3) was calculated using the individual pDADMAC concentration (measured for each preparation, at each level within each) occasion)

the overall Intermediate Precision (% RSD, n=6) was calculated using the individual pDADMAC concentrations (measured for each preparation, at each level throughout both) occasion).

Figure 5:
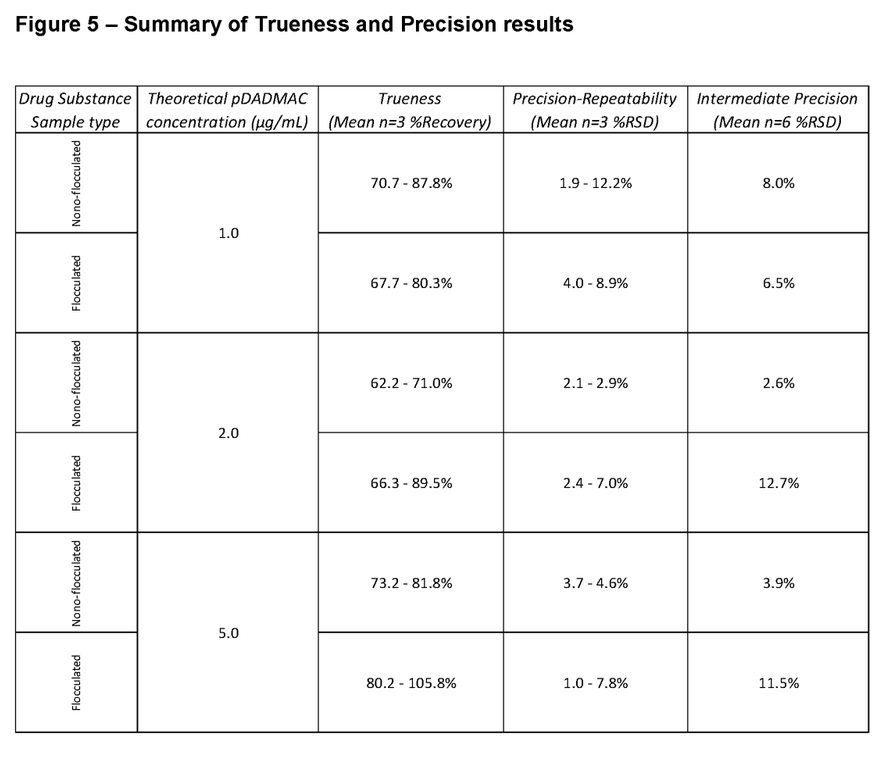
FIG. 5: Summary of Trueness and Precision results obtained in two Drug Substance samples spiked at three concentration levels (1.0-2.0 and 5.0 µg pDADMAC/mL).

As presented in FIG. 5, for such a low level impurity, the typical acceptance criteria were fulfilled for the three parameters at the three concentration levels evaluated:

Mean (n=3) % Recovery within 60%-140% for Trueness

Mean (n=3) % RSD≤15% for Precision-Repeatability

Overall Mean (n=6) % RSD≤20% for Intermediate Precision.

The Quantitation Limit of pDADMAC in the sample (calculated as the lowest concentration spiked in the sample at which the three typical acceptance criteria were fulfilled), was 1.0 μg pDADMAC/mL of sample.

Example 5: Application of the Method to Additional Antibody Formats

In an additional experiment, the method of the invention was validated for a Fab-scFv formulated at 58.2 mg/mL as well as for a Fab-2x dsscFv as described in WO 2015/197772 formulated at 80 mg/mL. The method was turned into a limit test at the 1.0 μg pDADMAC/mL limit of interest. In this case, the pDADMAC concentration (in μg/mL) measured in the spiked samples was quantitated against a calibration curve (from 0.3 to 5.0 μg pDADMAC/mL) in order to calculate the % Recovery versus the theoretical 1.0 μg/mL spiked concentration.

For both modified antibody formats, the contribution to the variability of the method coming from factors such as column, instrument and operator was considered as being the same. Therefore, four occasions were initially performed in the Fab-scFv sample spiked with 1.0 μg pDADMAC/mL (6 replicates at each occasion) to evaluate the Trueness, Precision-repeatability and Intermediate Precision. In addition, in a fifth experiment, the Trueness and the Precision-repeatability was verified for the Fab-2x dsscFv Fab spiked similarly.

Figure 6:
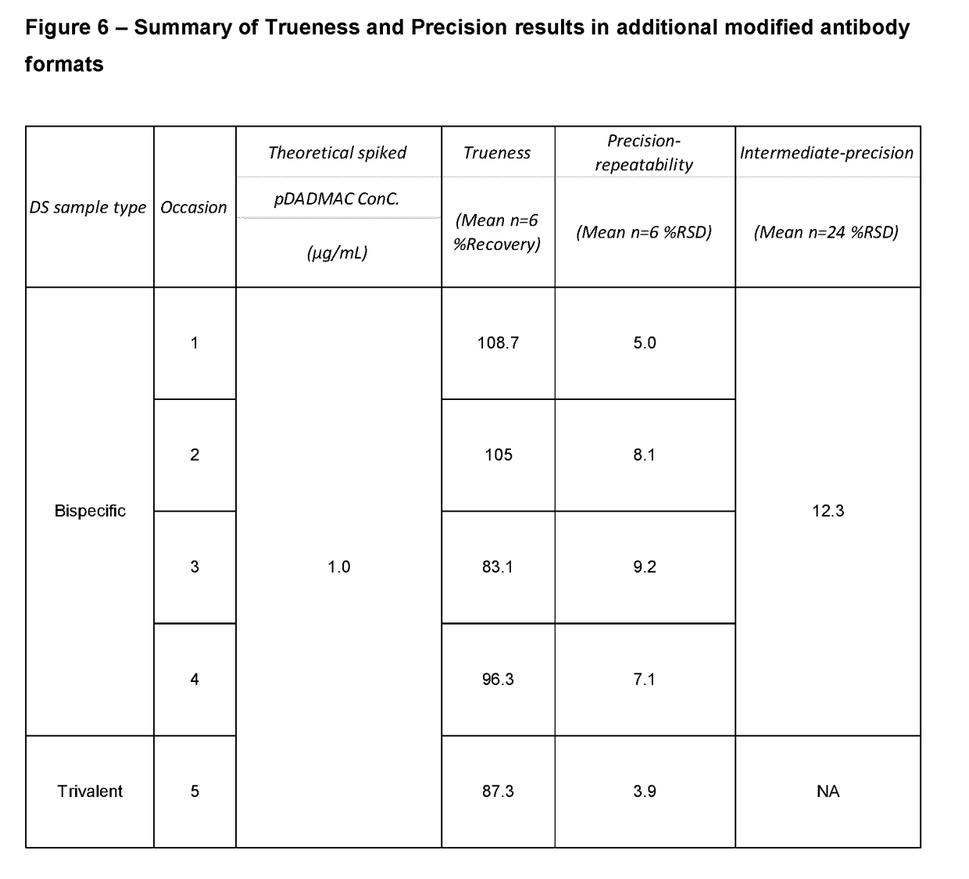
FIG. 6: Summary of Trueness and Precision results in additional modified antibody formats Fab-scFv (referred to as bispecific) and Fab-2x dsscFv (referred to as trivalent).

In both Fab-scFv and Fab-2x dsscFv samples, the 6 replicate spikings at 1.0 μg pDADMAC/mL underwent the addition of an aqueous 10% TFA solution followed with a 2-fold dilution in an appropriate buffer. The results obtained are presented in FIG. 6.

In both modified antibody formats, the Trueness and Precision-repeatability were assessed and the typical acceptance criteria were fulfilled (% Recovery within 60-140% and % RSD n=6 preparations not more than 15%). Furthermore, in the Fab-scFv antibody format, the Intermediate-precision evaluated in the four occasions, was within the acceptance criterion (overall RSD on the pDADMAC concentration measured in the 24 spiked samples not more than 20%).

Example 6: Application of the Method with a Different Sample Preparation

An alternative sample preparation was evaluated as a limit test method (limit of detection 1 μg/ml). For this measurement, two samples were prepared:

one sample is neat (drug substance as is obtained from the manufacturing process) and the other one is a 1ug pDADMAC/mL spiked, sample.

Both are then incubated at 80° C. for 3 hours with a strong acid (in this case hydrochloric acid 37%). After incubation, the samples are evaporated overnight until they are completely dry. They are then reconstituted in an aqueous 0.5% TFA solution before centrifugation on centrifugal filter unit (30 kDa cut off pore size) for purification and pDADMAC concentration. The samples containing pDADMAC retained by the filter are reconstituted in an aqueous 0.1% TFA solution.

The pDADMAC is then separated from the protein residues and the remaining excipients and impurities on the PLRP-S column and measured according the method of the invention using the CAD detector.

Figure 7:
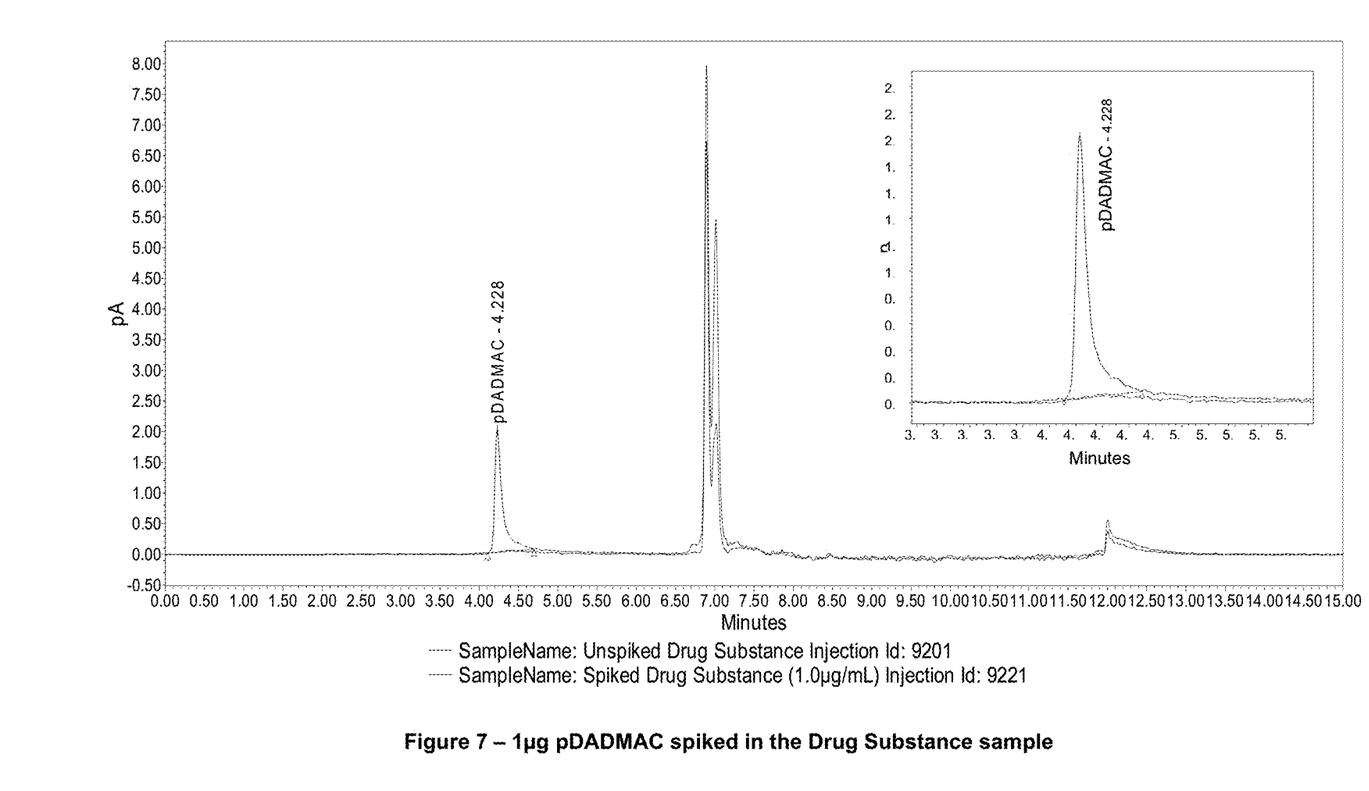
FIG. 7: Overlay of chromatographic profiles of a Drug Substance analyzed "as is" (unspiked) and spiked with 1.0 µg pDADMAC/mL.

An exemplary result is shown in FIG. 7. The method has been validated for several antibody formats assessing the specificity and the detection limit on 6 replicates for each occasion. The length of incubation with hydrochloric acid was optimized for each case, and was determined to be within 3 to 6 hours at 80° C.

The addition of these sample preparation steps is particularly interesting to assess pDADMAC clearance in in-process samples as the matrix interferences are completely removed.

The invention claimed is:

1. A method for measuring poly (diallyldimethylammonium chloride) (pDADMAC) in a sample containing a recombinant protein of interest, the method comprising the following steps:
   a) applying the sample to a reversed-phase hydrophobic interaction HPLC column,
   b) eluting bound pDADMAC from the column using hydrophobic gradient elution,
   c) measuring pDADMAC recovered in step b) using a charged aerosol detector (CAD),
   wherein the sample applied in a) comprises 0.2-3% (v/v) of a CAD-compatible acid.

2. The method according to claim 1, wherein the sample applied in step a) comprises a protein concentration of less than 200 mg/ml.

3. The method according to claim 2, wherein the sample applied in step a) comprises a protein concentration of 20-100 mg/ml.

4. The method according to claim 2, wherein the sample applied in step a) comprises a protein concentration of 20-60 mg/ml.

5. The method according to claim 1, wherein the sample applied in step a) has a pH from 2 to 4.

6. The method according to claim 1, wherein the sample applied in step a) comprises 0.5-1.5% (v/v) of a CAD-compatible acid.

7. The method according to claim 1, wherein said CAD-compatible acid is selected from trifluoro-acetic acid, acetic acid, heptafluorobutyric acid and formic acid.

8. The method according to claim 1, wherein the reversed-phase hydrophobic interaction HPLC is PLRP-S HPLC.

9. The method according to claim 1, wherein the method further comprises a step of determining the concentration of pDADMAC present in the sample by reference to a control.

10. The method according to claim 1, wherein the recombinant protein of interest is an antibody, an antibody fragment, or a derivative thereof.

11. The method according to claim 1, wherein the sample applied in step a) is a sample obtained directly from a step in purification of said recombinant protein to which the CAD-compatible acid has been added.

* * * * *